United States Patent
Joseph et al.

(10) Patent No.: US 8,165,281 B2
(45) Date of Patent: Apr. 24, 2012

(54) METHOD AND SYSTEM FOR MAPPING CALLER INFORMATION TO CALL CENTER AGENT TRANSACTIONS

(75) Inventors: Kurt M. Joseph, Austin, TX (US); Theodore Pasquale, Austin, TX (US); Benjamin Anthony Knott, Round Rock, TX (US); Robert R. Bushey, Cedar Park, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 1809 days.

(21) Appl. No.: 10/901,925

(22) Filed: Jul. 28, 2004

(65) Prior Publication Data

US 2006/0023863 A1 Feb. 2, 2006

(51) Int. Cl.
*H04M 3/00* (2006.01)
(52) U.S. Cl. .................. 379/265.02; 379/265.01
(58) Field of Classification Search .......... 379/265.01–265.14, 266.01–266.1
See application file for complete search history.

(56) References Cited

U.S. PATENT DOCUMENTS

| | | |
|---|---|---|
| 4,953,204 A | 8/1990 | Cuschleg, Jr. et al. |
| 4,967,405 A | 10/1990 | Upp et al. |
| 5,335,269 A | 8/1994 | Steinlicht |
| 5,455,903 A | 10/1995 | Jolissaint et al. |
| 5,497,373 A | 3/1996 | Hulen et al. |
| 5,522,046 A | 5/1996 | McMillen et al. |
| 5,530,744 A | 6/1996 | Charalambous et al. |
| 5,555,299 A | 9/1996 | Maloney et al. |
| 5,590,186 A | 12/1996 | Liao et al. |
| 5,652,789 A | 7/1997 | Miner et al. |
| 5,754,639 A | 5/1998 | Flockhart et al. |
| 5,754,978 A | 5/1998 | Perez-Mendez et al. |
| 5,794,001 A * | 8/1998 | Malone et al. ............... 715/762 |
| 5,867,817 A * | 2/1999 | Catallo et al. ............... 704/255 |
| 5,923,745 A | 7/1999 | Hurd |
| 5,937,051 A * | 8/1999 | Hurd et al. ............... 379/212.01 |
| 5,940,476 A | 8/1999 | Morganstein et al. |
| 5,946,388 A | 8/1999 | Walker et al. |
| 5,953,704 A | 9/1999 | McIlroy et al. |
| 5,999,965 A | 12/1999 | Kelly |
| 6,002,689 A | 12/1999 | Christie et al. |
| 6,002,760 A | 12/1999 | Gisby |
| 6,003,011 A | 12/1999 | Sarin et al. |

(Continued)

FOREIGN PATENT DOCUMENTS

EP 0 424 015 A2 4/1991

(Continued)

OTHER PUBLICATIONS

U.S. Appl. No. 10/898,722, filed Jul. 23, 2004.

(Continued)

*Primary Examiner* — William Deane, Jr.
(74) *Attorney, Agent, or Firm* — Toler Law Group, PC

(57) ABSTRACT

A system and method of processing a call at a call center is provided. In a particular embodiment, the method includes receiving the call at the call center, receiving an indication element associated with a call center transaction, retrieving call center transaction data based on the indication element, and generating a sequence of pre-populated call center agent terminal transaction processing screens based on at least a portion of the call center transaction data. In a particular embodiment, a set of prioritized transactions based on likelihood of matching a customer request is disclosed.

25 Claims, 3 Drawing Sheets

U.S. PATENT DOCUMENTS

| | | | |
|---|---|---|---|
| 6,049,594 A | 4/2000 | Furman et al. | |
| 6,118,866 A | 9/2000 | Shtivelman | |
| 6,119,101 A | 9/2000 | Peckover | |
| 6,173,266 B1 | 1/2001 | Marx et al. | |
| 6,173,289 B1 | 1/2001 | Sonderegger et al. | |
| 6,173,399 B1 | 1/2001 | Gilbrech | |
| 6,175,621 B1 | 1/2001 | Begeja | |
| 6,259,786 B1 | 7/2001 | Gisby | |
| 6,269,153 B1 | 7/2001 | Carpenter et al. | |
| 6,317,439 B1 | 11/2001 | Cardona et al. | |
| 6,333,980 B1 | 12/2001 | Hollatz et al. | |
| 6,334,127 B1 * | 12/2001 | Bieganski et al. | 707/5 |
| 6,353,608 B1 | 3/2002 | Cullers et al. | |
| 6,356,936 B1 * | 3/2002 | Donoho et al. | 709/206 |
| 6,366,658 B1 | 4/2002 | Bjornberg et al. | |
| 6,366,668 B1 | 4/2002 | Borst et al. | |
| 6,381,329 B1 | 4/2002 | Uppaluru et al. | |
| 6,385,584 B1 | 5/2002 | McAllister et al. | |
| 6,389,400 B1 | 5/2002 | Bushey et al. | |
| 6,400,804 B1 | 6/2002 | Bilder | |
| 6,400,996 B1 | 6/2002 | Hoffberg et al. | |
| 6,405,159 B2 | 6/2002 | Bushey et al. | |
| 6,414,966 B1 | 7/2002 | Kulkarni et al. | |
| 6,418,424 B1 | 7/2002 | Hoffberg et al. | |
| 6,442,247 B1 | 8/2002 | Garcia | |
| 6,510,414 B1 | 1/2003 | Chaves | |
| 6,519,562 B1 | 2/2003 | Phillips et al. | |
| 6,529,871 B1 | 3/2003 | Kanevsky et al. | |
| 6,553,113 B1 | 4/2003 | Dhir et al. | |
| 6,570,967 B2 | 5/2003 | Katz | |
| 6,574,599 B1 * | 6/2003 | Lim et al. | 704/270 |
| 6,584,180 B2 | 6/2003 | Nemoto | |
| 6,587,556 B1 | 7/2003 | Judkins et al. | |
| 6,598,136 B1 | 7/2003 | Norrod et al. | |
| 6,600,736 B1 | 7/2003 | Ball et al. | |
| 6,603,854 B1 | 8/2003 | Judkins et al. | |
| 6,614,781 B1 | 9/2003 | Elliott et al. | |
| 6,631,186 B1 | 10/2003 | Adams et al. | |
| 6,678,360 B1 | 1/2004 | Katz | |
| 6,678,718 B1 | 1/2004 | Khouri et al. | |
| 6,690,788 B1 | 2/2004 | Bauer et al. | |
| 6,694,012 B1 | 2/2004 | Posthuma | |
| 6,697,460 B2 | 2/2004 | Knott et al. | |
| 6,700,972 B1 | 3/2004 | McHugh et al. | |
| 6,704,404 B1 | 3/2004 | Burnett | |
| 6,707,789 B1 | 3/2004 | Arslan et al. | |
| 6,714,631 B1 | 3/2004 | Martin et al. | |
| 6,721,416 B1 | 4/2004 | Farrell | |
| 6,731,722 B2 | 5/2004 | Coffey | |
| 6,738,473 B1 | 5/2004 | Burg et al. | |
| 6,744,861 B1 | 6/2004 | Pershan et al. | |
| 6,744,877 B1 | 6/2004 | Edwards | |
| 6,751,306 B2 | 6/2004 | Himmel et al. | |
| 6,757,306 B1 | 6/2004 | Klish, II et al. | |
| 6,766,320 B1 | 7/2004 | Wang et al. | |
| 6,775,359 B1 | 8/2004 | Ron et al. | |
| 6,778,643 B1 | 8/2004 | Bushey et al. | |
| 6,792,096 B2 | 9/2004 | Martin et al. | |
| 6,807,274 B2 | 10/2004 | Joseph et al. | |
| 6,823,307 B1 | 11/2004 | Steinbiss et al. | |
| 6,831,932 B1 | 12/2004 | Boyle et al. | |
| 6,832,224 B2 | 12/2004 | Gilmour | |
| 6,842,504 B2 | 1/2005 | Mills et al. | |
| 6,847,711 B2 | 1/2005 | Knott et al. | |
| 6,853,722 B2 | 2/2005 | Joseph et al. | |
| 6,853,966 B2 | 2/2005 | Bushey et al. | |
| 6,859,529 B2 | 2/2005 | Duncan et al. | |
| 6,871,212 B2 | 3/2005 | Khouri et al. | |
| 6,879,683 B1 | 4/2005 | Fain et al. | |
| 6,885,734 B1 | 4/2005 | Eberle et al. | |
| 6,891,932 B2 | 5/2005 | Bhargava et al. | |
| 6,895,083 B1 | 5/2005 | Bers et al. | |
| 6,901,366 B1 | 5/2005 | Kuhn et al. | |
| 6,907,119 B2 | 6/2005 | Case et al. | |
| 6,915,246 B2 | 7/2005 | Gusler et al. | |
| 6,963,983 B2 | 11/2005 | Munson et al. | |
| 7,006,605 B1 | 2/2006 | Morganstein et al. | |
| 7,206,400 B2 * | 4/2007 | Dezonno et al. | 379/221.09 |
| 7,233,908 B1 * | 6/2007 | Nelson | 705/10 |
| 7,242,751 B2 * | 7/2007 | Bushey et al. | 379/88.03 |
| 2001/0011211 A1 | 8/2001 | Bushey et al. | |
| 2001/0018672 A1 | 8/2001 | Petters et al. | |
| 2001/0021948 A1 | 9/2001 | Khouri et al. | |
| 2001/0032229 A1 | 10/2001 | Hulls et al. | |
| 2001/0034662 A1 | 10/2001 | Morris | |
| 2002/0007303 A1 * | 1/2002 | Brookler et al. | 705/10 |
| 2002/0046030 A1 | 4/2002 | Haritsa et al. | |
| 2002/0057678 A1 | 5/2002 | Jiang et al. | |
| 2002/0059164 A1 | 5/2002 | Shtivelman | |
| 2002/0059169 A1 | 5/2002 | Quarterman et al. | |
| 2002/0067714 A1 | 6/2002 | Crain et al. | |
| 2002/0087385 A1 | 7/2002 | Vincent | |
| 2002/0114432 A1 | 8/2002 | Shaffer et al. | |
| 2002/0133394 A1 | 9/2002 | Bushey et al. | |
| 2002/0133413 A1 | 9/2002 | Chang et al. | |
| 2002/0135618 A1 | 9/2002 | Maes et al. | |
| 2002/0156699 A1 | 10/2002 | Gray et al. | |
| 2002/0165732 A1 | 11/2002 | Ezzeddine et al. | |
| 2002/0196277 A1 | 12/2002 | Bushey et al. | |
| 2003/0026409 A1 | 2/2003 | Bushey et al. | |
| 2003/0035381 A1 | 2/2003 | Chen et al. | |
| 2003/0035516 A1 | 2/2003 | Guedalia | |
| 2003/0069937 A1 | 4/2003 | Khouri et al. | |
| 2003/0097428 A1 | 5/2003 | Afkhami et al. | |
| 2003/0103619 A1 | 6/2003 | Brown et al. | |
| 2003/0114105 A1 | 6/2003 | Haller et al. | |
| 2003/0118159 A1 | 6/2003 | Shen et al. | |
| 2003/0130864 A1 | 7/2003 | Ho et al. | |
| 2003/0143981 A1 | 7/2003 | Kortum et al. | |
| 2003/0144846 A1 | 7/2003 | Denenberg et al. | |
| 2003/0144919 A1 | 7/2003 | Trompette et al. | |
| 2003/0156133 A1 | 8/2003 | Martin et al. | |
| 2003/0165223 A1 | 9/2003 | Timmins et al. | |
| 2003/0187732 A1 | 10/2003 | Seta | |
| 2003/0187773 A1 | 10/2003 | Santos et al. | |
| 2003/0194063 A1 | 10/2003 | Martin et al. | |
| 2003/0195753 A1 | 10/2003 | Homuth | |
| 2003/0202640 A1 | 10/2003 | Knott et al. | |
| 2003/0202643 A1 | 10/2003 | Joseph et al. | |
| 2003/0202649 A1 | 10/2003 | Haug, Jr. et al. | |
| 2003/0204435 A1 * | 10/2003 | McQuilkin et al. | 705/10 |
| 2003/0228007 A1 | 12/2003 | Kurosaki | |
| 2003/0235287 A1 | 12/2003 | Margolis | |
| 2004/0005047 A1 | 1/2004 | Joseph et al. | |
| 2004/0006473 A1 | 1/2004 | Mills et al. | |
| 2004/0030649 A1 * | 2/2004 | Nelson et al. | 705/44 |
| 2004/0032862 A1 | 2/2004 | Schoeneberger et al. | |
| 2004/0032935 A1 | 2/2004 | Mills et al. | |
| 2004/0042592 A1 | 3/2004 | Knott et al. | |
| 2004/0044950 A1 | 3/2004 | Mills et al. | |
| 2004/0066401 A1 | 4/2004 | Bushey et al. | |
| 2004/0066416 A1 | 4/2004 | Knott et al. | |
| 2004/0073569 A1 | 4/2004 | Knott et al. | |
| 2004/0083479 A1 | 4/2004 | Bondarenko et al. | |
| 2004/0088285 A1 | 5/2004 | Martin et al. | |
| 2004/0103017 A1 | 5/2004 | Reed et al. | |
| 2004/0109555 A1 | 6/2004 | Williams | |
| 2004/0120473 A1 | 6/2004 | Birch et al. | |
| 2004/0125937 A1 | 7/2004 | Turcan et al. | |
| 2004/0125938 A1 | 7/2004 | Turcan et al. | |
| 2004/0125940 A1 | 7/2004 | Turcan et al. | |
| 2004/0161078 A1 | 8/2004 | Knott et al. | |
| 2004/0161094 A1 | 8/2004 | Martin et al. | |
| 2004/0161096 A1 | 8/2004 | Knott et al. | |
| 2004/0174980 A1 | 9/2004 | Knott et al. | |
| 2004/0230438 A1 | 11/2004 | Pasquale et al. | |
| 2004/0240635 A1 | 12/2004 | Bushey et al. | |
| 2004/0243568 A1 | 12/2004 | Wang et al. | |
| 2005/0008141 A1 | 1/2005 | Kortum et al. | |
| 2005/0015744 A1 | 1/2005 | Bushey et al. | |
| 2005/0027535 A1 | 2/2005 | Martin et al. | |
| 2005/0041796 A1 | 2/2005 | Joseph et al. | |
| 2005/0047578 A1 | 3/2005 | Knott et al. | |
| 2005/0055216 A1 | 3/2005 | Bushey et al. | |
| 2005/0058264 A1 | 3/2005 | Joseph et al. | |
| 2005/0075894 A1 | 4/2005 | Bushey et al. | |
| 2005/0078805 A1 | 4/2005 | Mills et al. | |

| | | | |
|---|---|---|---|
| 2005/0080630 A1 | 4/2005 | Mills et al. | |
| 2005/0080667 A1 | 4/2005 | Knott et al. | |
| 2005/0131892 A1 | 6/2005 | Knott et al. | |
| 2005/0132262 A1 | 6/2005 | Bushey et al. | |
| 2005/0135595 A1 | 6/2005 | Bushey et al. | |
| 2005/0141692 A1 | 6/2005 | Schere et al. | |
| 2005/0169441 A1 | 8/2005 | Yacoub et al. | |
| 2005/0169453 A1 | 8/2005 | Knott et al. | |
| 2005/0201547 A1 | 9/2005 | Burg et al. | |
| 2005/0240411 A1 | 10/2005 | Yacoub | |
| 2005/0254632 A1* | 11/2005 | Pasquale et al. | 379/88.04 |
| 2005/0278655 A1* | 12/2005 | Sims | 715/792 |
| 2007/0206772 A1* | 9/2007 | Sato et al. | 379/265.02 |

FOREIGN PATENT DOCUMENTS

| | | |
|---|---|---|
| EP | 0 424 015 A3 | 4/1991 |
| EP | 0 424 015 B1 | 4/1991 |
| EP | 0 876 652 A4 | 9/1996 |
| WO | WO 97/26612 | 7/1997 |
| WO | WO 01/37539 A2 | 5/2001 |
| WO | WO 01/37539 A3 | 5/2001 |
| WO | WO 2004/017584 | 2/2004 |
| WO | WO 2004/049222 A2 | 6/2004 |

OTHER PUBLICATIONS

U.S. Appl. No. 10/901,926, filed Jul. 28, 2004.
U.S. Appl. No. 10/975,023, filed Oct. 27, 2004.
U.S. Appl. No. 10/917,233, filed Aug. 12, 2004.
U.S. Appl. No. 10/935,726, filed Sep. 7, 2004.
U.S. Appl. No. 10/999,199, filed Nov. 29, 2004.
U.S. Appl. No. 11/005,498, filed Dec. 6, 2004.
U.S. Appl. No. 11/005,494, filed Dec. 6, 2004.
U.S. Appl. No. 11/010,633, filed Dec. 13, 2004.
U.S. Appl. No. 11/032,495, filed Jan. 10, 2005.
U.S. Appl. No. 11/036,204, filed Jan. 14, 2005.
U.S. Appl. No. 11/036,201, filed Jan. 14, 2005.
U.S. Appl. No. 11/062,100, filed Feb. 18, 2005.
U.S. Appl. No. 11/086,796, filed Mar. 23, 2005.
U.S. Appl. No. 11/129,051, filed May 13, 2005.
U.S. Appl. No. 11/145,513, filed Jun. 3, 2005.
U.S. Appl. No. 11/173,227, filed Jul. 1, 2005.
U.S. Appl. No. 11/176,972, filed Jul. 7, 2005.
U.S. Appl. No. 11/086,794, filed Mar. 22, 2005.
U.S. Appl. No. 10/996,127, filed Nov. 23, 2004.
U.S. Appl. No. 10/920,719, filed Dec. 13, 2004.
U.S. Appl. No. 10/920,720, filed Aug. 18, 2004.
U.S. Appl. No. 10/948,089, filed Sep. 23, 2004.
U.S. Appl. No. 10/979,784, filed Nov. 2, 2004.
U.S. Appl. No. 11/212,939, filed Aug. 25, 2005.
Ogino, Tsukasa, et al., "Technologies for Internet Infrastructure: Eliminating the World Wide Wait," iNet Japan, Jul. 18-21, 2000, www.isoc.org/inet2000/cdproceedings/1g/index.

* cited by examiner

METHOD AND SYSTEM FOR MAPPING CALLER INFORMATION TO CALL CENTER AGENT TRANSACTIONS

FIELD OF THE DISCLOSURE

The present disclosure relates generally to mapping information to specific call center transactions.

BACKGROUND

Tens of millions of calls are routed to call centers annually. A large percentage of these calls use agents to identify and map the customer's opening statement to one or more agent transaction screens that are accessed to fulfill the customer's request. For example, a customer's opening statement may ask for the creation of an order for DSL provisioning and an agent may access one or more screens associated with provisioning DSL. Currently, agents simultaneously control multiple support systems by accessing these transaction screens. This accessing and mapping process accounts for a significant portion of the average call length primarily because of the considerable mental processing demands associated with existing agent support systems. It is estimated that approximately 10-20% of the agent time for handling an average call is associated with the mapping process. This mapping process reduces the volume of calls an agent can handle and increases the average per call expense. As such, there is a need for an improved system and method for mapping caller information to call center agent transactions.

DETAILED DESCRIPTION OF THE DRAWINGS

In a particular embodiment, the disclosure is directed to a system including a call center routing and control module, a transaction database including a plurality of transactions that are suitable for execution by the call center, transaction selection logic responsive to the transaction database and including logic to select a set of transactions for execution in response to the transaction identifier, and display screen sequence logic responsive to the transaction selection logic. The call center routing and control module has an input to receive incoming calls and to receive a transaction identifier indicative of a caller transaction to be executed. The custom screen sequence logic is configured to generate screen sequence commands corresponding to a sequence of pre-populated screen views associated with the set of selected transactions.

In another particular embodiment, the disclosure is directed to a method of processing a call at a call center. The method includes receiving the call at the call center, receiving an indication element associated with a call center transaction, retrieving call center transaction data based on the indication element, generating custom screen sequence logic, generating screen sequence commands based on the custom screen sequence logic, and displaying a sequence of pre-populated screen views based on at least a portion of the call center transaction data.

In another particular embodiment, a method of call handling is disclosed. The method includes collecting data at an interactive voice response unit, forwarding the collected data to a remote analysis module, comparing the collected data to a plurality of call center transactions, processing the particular call center transaction to generate custom screen sequence logic, generating screen sequence commands based on the custom screen sequence logic, and displaying a sequence of pre-populated screen views in response to determining a match between a particular call center transaction and the collected data.

Figure 1:
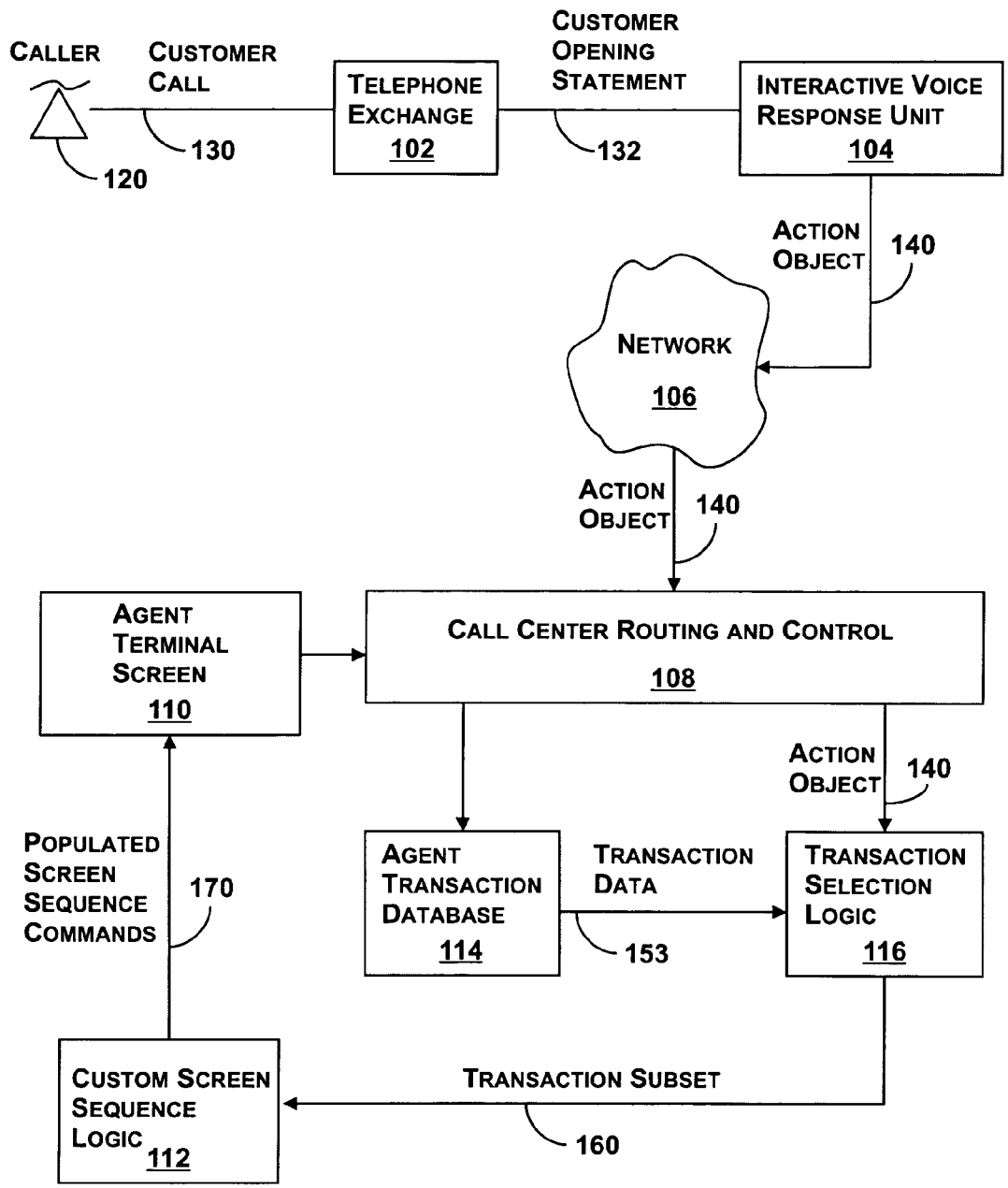
FIG. 1 is a block diagram that illustrates a communications system having a supporting call center.

Referring to FIG. 1, an illustrative system is shown. The system includes a telephone exchange 102, an interactive voice response unit 104, a distributed computer network represented as a cloud 106, and a call center routing and control module 108. The system further includes an agent transaction database 114, transaction selection logic 116, custom screen sequence logic 112, and a call center agent terminal 110.

During operation, a customer call 130 from a representative caller 120 is received at the telephone exchange 102. The telephone exchange 102 forwards the call and a customer opening statement 132 originated by the caller 120 to the interactive voice response unit 104. The interactive voice response unit 104 maps the customer opening statement to a transaction identification element, such as an action object data pair 140 that is fed through network 106 to be received at the call center routing and control module 108. The action object pair 140 is an identifier of a particular call center transaction that may be executed by the call center supporting the customer call. The transaction identifier, such as an action object, functions as a prediction of a requested call center transaction service that may be provided to the caller 120. In effect, the system, based on an initial evaluation and analysis of customer opening statement 132, predicts a particular call center transaction or set of transactions that are likely being requested by the caller 120. An example of an illustrative action-object pair matrix that maps various opening statements to call center transactions is provided below:

A1. Caller Opening Statement: "I'd like to change the date for installing my telephone service."
A2. Action-Object: Change Due Date
A3. Transaction: CDUE
B1. Caller Opening Statement: "I need help setting up CallNotes."
B2. Action-Object: How to Use Optional Services
B3. Transaction: HTUOptCN At call center 108, the transaction identifier, such as the action object pair 140, is received. The action object pair 140 is routed to the transaction selection logic 116. The transaction selection logic 116 receives transaction data 153 from the agent transaction database 114. Out of a plurality of transactions that are suitable for execution by the call center, a subset of such transactions and data representative thereof is fed to the transaction selection logic 116 for further processing. Transaction selection logic 116 thereby provides a transaction subset 160 in response to the action object pair 140 and selected transaction data 153. The transaction subset 160 is fed to custom screen sequence logic 112. The custom screen sequence logic 112 transforms the particular transaction subset 160 and produces populated screen sequence commands 170. An example of such populated screen sequence commands 170 includes terminal commands forwarded to agent terminal 110 to provide a programmed sequence of pre-populated screen views. The sequence of pre-populated screen views corresponds to the selected transaction or subset of transactions identified by the transaction selection logic 116. The screen sequence commands 170 also corresponds to the particular action object pair 140 communicated to the call center in response to the customer opening statement.

Figure 2:
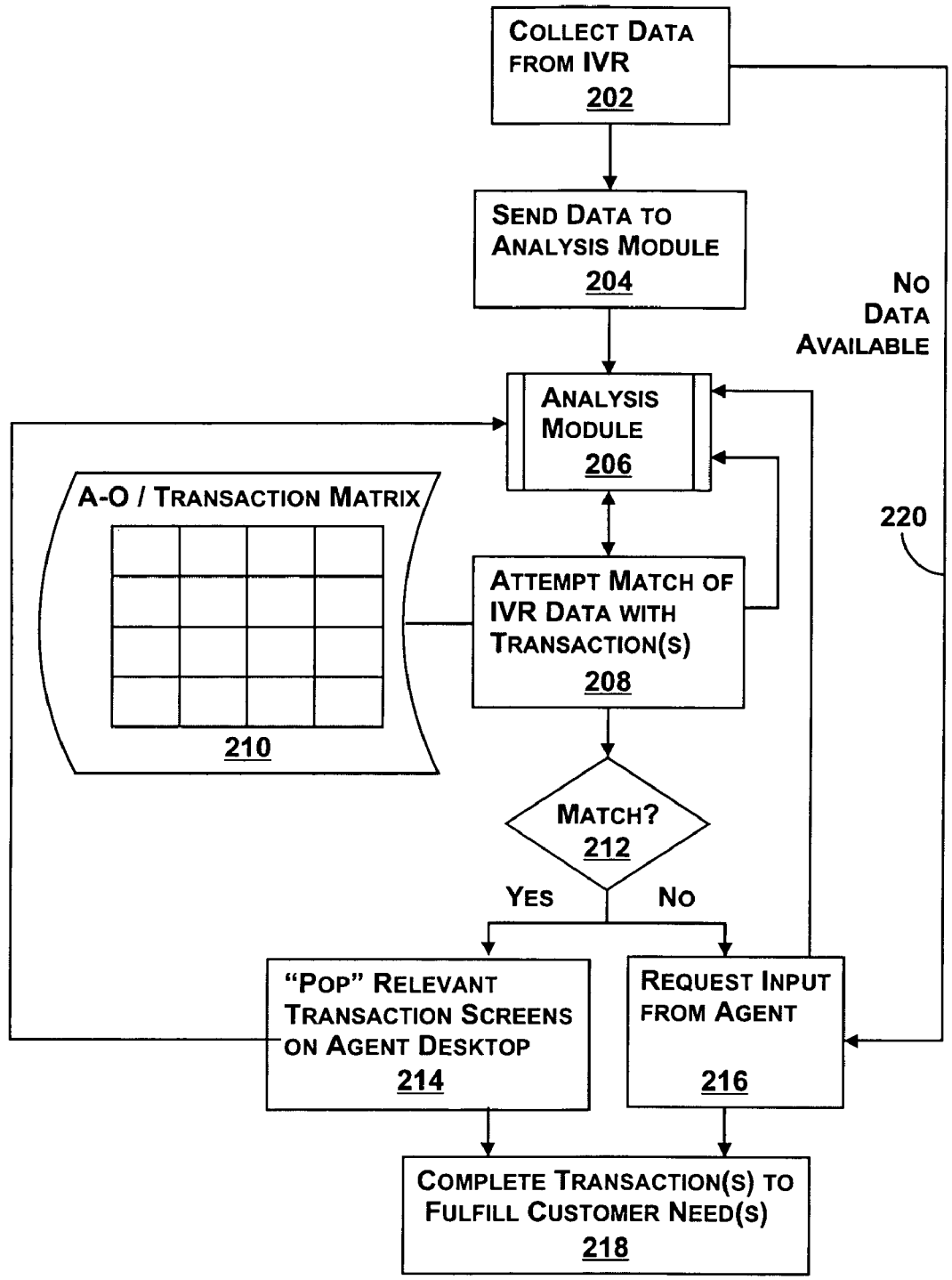
FIG. 2 is a flow chart of a method of operation of the system of FIG. 1.

The agent terminal 110 includes a display screen that provides a sequence of pre-populated screen views 172 to an agent in response to receiving the screen sequence commands 170 from the custom screen sequence logic 112. An example of agent terminal commands is presented below:

Command Sequence for Change Due Date (CDUE) Transaction:
1. Maximize Order application tool window
2. Select Account Info from order application menu and then select Account Inquiry submenu
3. Type order number in field and select Change DD button
4. Select appropriate reason code from drop-down menu and select OK button Referring to FIG. 2, a method of operating a call center support system such as the system of FIG. 1, is shown. The method includes call handling functionality and begins with collecting data from an interactive voice response (IVR) unit, as shown at 202. The collected data is forwarded to an analysis module, as shown at 204, and the collected data is received and processed at the analysis module, as shown at 206. The collected data from the IVR may include a caller opening statement and such data is paired, through the analysis module, with a particular action object. The action object is compared with the action object transaction matrix 210 to determine a set of transactions associated with the action object, as shown at 208. Decision logic, shown at 212, determines whether a match has been made between the action object determined from the IVR collected data and a transaction retrieved from the action object transaction matrix 210. When a match is made, the call is provided to the agent and a relevant transaction screens are popped or displayed onto an agent desktop, as shown at 214. For example, a custom screen logic sequence of commands may be sent to an agent terminal to display a sequence of pre-populated agent screens. After the set of relevant transaction screens have been displayed on the agent desktop, and after any additional call data is retrieved by the agent via the agent terminal, a call center transaction corresponding to the sequence of pre-populated screen views is executed and completed to fulfill a caller request, as shown at 218.

In the event that there is no match between the collected data and the action object matrix, then processing proceeds to request input from a live agent at an agent terminal, as shown at 216. In this case, a live agent would request further information from the caller and would determine the requested transaction without the assistance of using the action-object pair data. The agent would then enter the requested transaction as well as associated information from the caller to fulfill the customer requested transaction, at 218. Thus, where a successful match is determined between the action object and transactions in the matrix 210, certain manual processing steps typically performed by a live agent at a call center may be automated, thereby reducing agent call center transaction time.

Given the high call volume of call centers and the benefits of enhanced customer care, the disclosed method and system of automating and pre-populating certain requested transactions may beneficially reduce call center costs and provide more efficient and responsive processing of requested customer actions.

Figure 3:
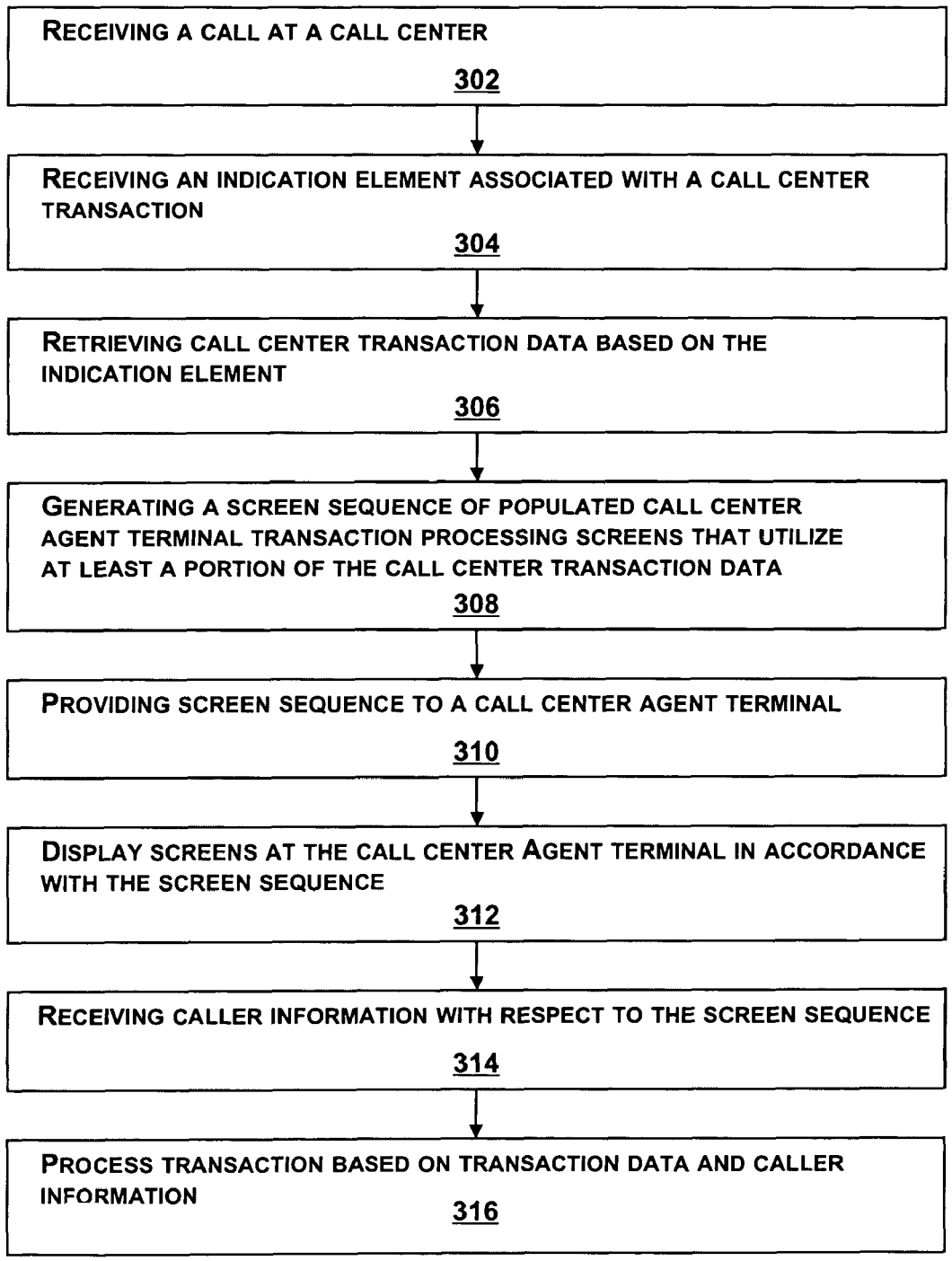
FIG. 3 is a flow chart that illustrates a method of operation of a call center.

Referring to FIG. 3, a particular embodiment of a method of processing a call at a call center is disclosed. The method includes receiving a call at a call center, as shown at step 302. The method further includes receiving an indication element associated with a call center transaction, as shown at step 304. An example of an indication element is an action object pair. Call center transaction data based on the particular indication element is then retrieved, as shown at step 306. The method further includes generating a screen sequence of pre-populated screen views that utilize at least a portion of the call center transaction data, as shown at 308. For example, a sequence of pre-populated screen views may be generated in response to the identification of a requested caller transaction. An example of a requested caller transaction would be to add, modify, or delete a particular telephony service, or to respond to a bundled offering or adjustment to a service plan. Other potential caller request transactions could relate to billing and/or payment matters. Examples of telephony service include long distance, local, wireless, broadband data, IP telephony including voice over IP and video over IP, call notes and other messaging services. A particular sequence of pre-populated screen views is then provided to a call center agent at an agent terminal, as shown at step 310. Display screens at the call center agent terminal are displayed for viewing in accordance with the screen sequence logic, as shown at step 312. In response to the display screens having at least some pre-populated data, the agent can query a caller to request further desired information for fulfilling the transaction. The agent and agent terminal receive additional caller information with respect to the transaction screens, as shown at step 314, and the requested transaction is processed by the call center based on the transaction data and based on the caller information, as shown at step 316.

The disclosed method and system provides an automatic mapping of information from customer opening statements at IVR units to agent transaction screens to be accessed in order to fulfill customer call center requests. The mapping process may account for a significant portion of an average call due to the mental processing demands typically associated with agent support systems. Thus, the disclosed method and system may reduce demands on agent mental processing and thereby decrease the amount of time a particular agent takes to complete the mapping and call service process. Reductions in call length would be beneficial and provide cost savings for the support of inbound customer calls.

In addition, the disclosed mapping process utilizes an action-object pair that provides a likelihood estimator to provide an ordered set of possible transactions where the transactions are prioritized from most likely to least likely. This estimation and prioritization may be based on historical, marketing, customer, or other data. In addition, low likelihood transactions may be removed from consideration based on selected thresholds or criteria that are included in an analysis module. The analysis and determination of transaction likelihood may be adjusted as data is collected to improve prediction accuracy.

In a particular embodiment, upon completion of the action object pair analysis, the system may present an agent with an action object pair and a set of transactions ranging from those with the highest likelihood to the lowest likelihood of matching the perceived customer request, including ranking scores of such likelihoods. An example output of a set of transactions with likelihood scores is shown below:

Example Output:

| | |
|---|---|
| 1. HTUOptCN (How to Use CallNotes) | 95% |
| 2. HTUOptCID (How to Use CallerID) | 78% |
| 3. HTUOptCB (How to Use Call Blocker) | 47% |

The agent can either accept such transactions or can request further information from the customer to reduce the set of transactions that may be used to satisfy the customer's call request. The agent selections that are made during the process of caller interaction may be captured to provide further input for the estimator to increase the accuracy of future mappings. Accordingly, the disclosed system and method shifts significant processing of filtering and mapping customer opening statements from a human agent to an automated computer analysis module and thereby reduces agent demands and decreases calling time.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A system comprising:
    a call center routing and control module having an input to receive incoming calls and to receive a transaction identifier indicative of a caller transaction to be executed;
    a transaction database including a plurality of transactions that are suitable for execution by a call center;
    transaction selection logic responsive to the transaction database and including logic to generate an ordered set of possible transactions for execution, wherein each possible transaction has a likelihood score above a threshold, and logic to present the ordered set of possible transactions ranked in order from highest likelihood to lowest likelihood including likelihood scores associated with each possible transaction to an agent terminal; and
    screen sequence logic responsive to the transaction selection logic, the screen sequence logic configured to generate screen sequence commands for the agent terminal corresponding to a sequence of pre-populated screen views associated with the ordered set of possible transactions.

2. The system of claim 1, further comprising the agent terminal, wherein the agent terminal is responsive to the call center routing and control module.

3. The system of claim 2, wherein the agent terminal is responsive to the screen sequence commands.

4. The system of claim 3, wherein the agent terminal includes a display and wherein the display generates the sequence of pre-populated screen views in response to the screen sequence commands.

5. The system of claim 1, wherein the call center routing and control module is responsive to a network interface connection.

6. The system of claim 1, wherein the transaction identifier is indicative of the caller transaction is an action-object pair.

7. The system of claim 6, wherein the action-object pair is determined in response to receiving a customer opening statement at an interactive voice response unit remotely coupled to the call center routing and control module via a distributed network.

8. The system of claim 7, wherein the distributed network is a telephony network.

9. The system of claim 1, further comprising an interactive voice response unit in remote communication with respect to the call center routing and control module.

10. The system of claim 9, wherein the interactive voice response unit is responsive to a telephone exchange.

11. The system of claim 10, wherein the interactive voice response unit has an input to receive calls and to receive a customer opening statement from the telephone exchange.

12. A method of processing a call at a call center, the method comprising:
    receiving the call at the call center;
    receiving a customer opening statement associated with a call center transaction from a customer;
    retrieving call center transaction data based on the customer opening statement;
    generating an ordered set of possible transactions with each transaction having a likelihood score, wherein the possible transactions are ordered based on a comparison of the customer opening statement to the call center transaction data; and
    presenting the ordered set of possible transactions ranked in order from highest likelihood to lowest likelihood including likelihood scores associated with each possible transaction to a call center agent terminal.

13. The method of claim 12, further comprising requesting information from the customer to reduce the ordered set of possible transactions.

14. The method of claim 12, further comprising displaying a sequence of display screens at the call center agent terminal in accordance with the ordered set of possible transactions.

15. The method of claim 14, further comprising receiving caller information related to the display screens.

16. The method of claim 15, further comprising processing the call center transaction based on the call center transaction data and based on the caller information.

17. The method of claim 12, further comprising determining an indication element based on an action-object pair associated with the caller opening statement received at an interactive voice response unit.

18. The method of claim 12, wherein the possible transactions include at least one of adding a telephony service, modifying a telephony service, and disconnecting a telephony service.

19. The method of claim 18, wherein the telephony service comprises call notes.

20. The method of claim 18, wherein the telephony service comprises long-distance telephone service.

21. The method of claim 18, wherein the telephony service comprises a bundle of different services.

22. A method of call handling comprising:
    collecting data at an interactive voice response unit;
    forwarding the collected data to a remote analysis module;
    comparing the collected data to a plurality of call center transactions;
    generating an ordered set of possible transactions with each transaction having a likelihood score, wherein the possible transactions are ordered based on the collected data;
    presenting the ordered set of possible transactions ranked in order from highest likelihood to lowest likelihood including likelihood scores associated with each possible transaction to an agent terminal; and
    processing a call center transaction that is related to the collected data.

23. The method of claim 22, further comprising accessing a matrix that maps caller requests and the call center transactions to compare the collected data to the plurality of call center transactions.

24. The method of claim 23, wherein the matrix is an action-object transaction matrix.

25. The method of claim 22, wherein the collected data comprises a caller opening statement.

* * * * *